US012803371B2

(12) United States Patent
Rossner et al.

(10) Patent No.: US 12,803,371 B2
(45) Date of Patent: Nov. 17, 2026

(54) STATOR FOR AN ELECTRIC MACHINE AND METHOD FOR PRODUCING A STATOR FOR AN ELECTRIC MACHINE

(71) Applicant: MOLABO GmbH, Ottobrunn (DE)

(72) Inventors: Stefan Rossner, Munich (DE); Florian Bachheibl, Munich (DE)

(73) Assignee: MOLABO GMBH, Ottobrunn (DE)

(*) Notice: Subject to any disclaimer, the term of this patent is extended or adjusted under 35 U.S.C. 154(b) by 137 days.

(21) Appl. No.: 17/921,256

(22) PCT Filed: Apr. 22, 2021

(86) PCT No.: PCT/EP2021/060564
§ 371 (c)(1),
(2) Date: Oct. 25, 2022

(87) PCT Pub. No.: WO2021/219489
PCT Pub. Date: Nov. 4, 2021

(65) Prior Publication Data

US 2023/0188014 A1 Jun. 15, 2023

(30) Foreign Application Priority Data

Apr. 29, 2020 (DE) ..................... 10 2020 111 704.3

(51) Int. Cl.
*H02K 3/50* (2006.01)
*H02K 3/52* (2006.01)
(Continued)

(52) U.S. Cl.
CPC ............... *H02K 5/225* (2013.01); *H02K 3/50* (2013.01); *H02K 3/52* (2013.01); *H02K 1/16* (2013.01); *H02K 3/12* (2013.01); *H02K 15/021* (2025.01)

(58) Field of Classification Search
CPC ........ H02K 5/225; H02K 1/16; H02K 15/024; H02K 3/12; H02K 3/38; H02K 3/46; H02K 3/50; H02K 3/52; H02K 3/522
(Continued)

(56) References Cited

U.S. PATENT DOCUMENTS 268,205 A 11/1882 Edison
6,252,327 B1 * 6/2001 Matsuzaki ............... H02K 3/12 310/201
(Continued)

FOREIGN PATENT DOCUMENTS

CN 101577472 A 11/2009
DE 10143217 C1 2/2003
(Continued)

OTHER PUBLICATIONS

Dajaku Gurakuq, Winding System for a Stator of an Electric Machine, DE 102017116145 (English Machine Translation) (Year: 2018).*
(Continued)

*Primary Examiner* — Alexander A Singh
(74) *Attorney, Agent, or Firm* — Devlin Law Firm LLC

(57) ABSTRACT

A stator for an electric machine comprises a stator core, at least two grooves which are arranged in the stator core, an electrical winding which comprises at least two dimensionally stable electrical conductors, and at least one interconnecting element on at least one side of the stator core, wherein at least one of the conductors is arranged in the grooves, respectively, the interconnecting element is electrically connected to at least one of the conductors, the interconnecting element is mechanically connected to the stator core via at least one of the conductors, the conductors are each mechanically fixed in the grooves, and the mechanical connection between the interconnecting element and the
(Continued)

stator core is self-supporting via at least one of the conductors. In addition, an electric machine and a method for producing a stator for an electric machine are specified.

14 Claims, 6 Drawing Sheets

(51) Int. Cl.

| | |
|---|---|
| ***H02K 5/22*** | (2006.01) |
| *H02K 1/16* | (2006.01) |
| *H02K 3/12* | (2006.01) |
| *H02K 15/021* | (2025.01) |

(58) Field of Classification Search
USPC .......... 310/71
See application file for complete search history.

(56) References Cited

U.S. PATENT DOCUMENTS

| | | | | |
|---|---|---|---|---|
| 6,958,561 | B2 | 10/2005 | Liao | |
| 8,076,817 | B2 | 12/2011 | Ciampolini et al. | |
| 2005/0151439 | A1 | 7/2005 | Grundl et al. | |
| 2005/0189833 | A1 | 9/2005 | Liao | |
| 2007/0052315 | A1 | 3/2007 | Grundl et al. | |
| 2008/0136274 | A1 | 6/2008 | Fujii et al. | |
| 2010/0038988 | A1 | 2/2010 | Ramy et al. | |
| 2010/0045134 | A1 | 2/2010 | Ciampolini et al. | |
| 2013/0020901 | A1 * | 1/2013 | Kishi | H02K 3/12 310/215 |
| 2013/0200743 | A1 * | 8/2013 | Okimitsu | H02K 3/12 310/201 |
| 2015/0214820 | A1 | 7/2015 | Geoffrion et al. | |
| 2018/0166931 | A1 | 6/2018 | Takahashi et al. | |

FOREIGN PATENT DOCUMENTS

| | | | | |
|---|---|---|---|---|
| DE | 10329641 | A1 | 2/2005 | |
| DE | 102007021737 | A1 | 11/2008 | |
| DE | 102016221043 | A1 | 4/2018 | |
| DE | 102017116145 | B3 * | 11/2018 | H02K 1/16 |
| DE | 102017129134 | A1 | 6/2019 | |
| EP | 2112747 | A1 | 10/2009 | |
| JP | 2015019488 | A | 1/2015 | |

OTHER PUBLICATIONS

Office Action for the German Application No. DE202010111704 mailed on Jan. 27, 2021, 7 pages.
International Search Report in corresponding International Application No. PCT/EP2021/060564, mailed Jul. 5, 2021, 6 pages.
Office Action for the German Application No. DE202010111704 mailed on Feb. 4, 2025, 18 pages.
Office Action issued in Chinese Patent Application No. 202180031542.3, May 27, 2025, 17 pages.
Office Action from Indian Patent Application No. 202227058298, issued Jun. 2, 2026, with English translation (7 pages).
Office Action from Chinese Patent Application No. 202180031542.3, issued May 20, 2026, with English translation (31 pages).

* cited by examiner

STATOR FOR AN ELECTRIC MACHINE AND METHOD FOR PRODUCING A STATOR FOR AN ELECTRIC MACHINE

CROSS-REFERENCE TO RELATED APPLICATIONS

This application is a U.S. National Stage of International Application No. PCT/EP2021/060564, filed on Apr. 22, 2021, and claims priority to German Patent Application No. 102020111704.3, filed on Apr. 29, 2020, the disclosures of which are incorporated by reference herein in their entireties.

FIELD OF THE INVENTION

The present application relates to a stator for an electric machine and a method for producing a stator for an electric machine.

BACKGROUND

Electric machines can be motor-driven or generator-driven. The stator can comprise an electrical winding in grooves which is formed by electrical conductors. The electrical winding is connected to a power supply unit which can be multiphase.

In order to form the electrical winding or to connect the electrical conductors, one or more interconnecting elements can be attached to one side of the stator. The interconnecting elements make contact with the electrical conductors. Therefore, it is necessary to electrically insulate the interconnecting elements with respect to one another. In order to attach the interconnecting elements to the stator, a large number of assembly steps and connection processes are often necessary. In addition, carrier systems are often used to fasten the interconnecting elements. This method of production and the necessary components increase the complexity of the electric machine.

SUMMARY OF THE INVENTION

An object to be achieved consists in specifying a stator for an electric machine, which stator can be produced efficiently. A further object to be achieved consists in specifying an efficient method for producing a stator for an electric machine.

The objects are achieved by the subjects of the independent claims. Advantageous configurations and developments are specified in the dependent claims.

According to at least one embodiment of the stator for an electric machine, the stator comprises a stator core. The stator core can extend along a longitudinal axis. The stator core can have a multiplicity of laminated stator cores. The laminated stator cores can be arranged one above the other. Overall, the stator core can have the shape of a cylinder. The longitudinal axis of the stator core runs parallel to the longitudinal axis of the cylinder. The stator core can have a magnetic material.

The stator further comprises at least two grooves which are arranged in the stator core. The grooves can be formed in the stator core. The grooves can extend through the stator core. In particular, the grooves can extend completely through the stator core. This means that the grooves can extend from a first side of the stator core to a second side of the stator core. The first and the second side are in each case the base surface and the top surface of the cylinder. The grooves can therefore each have a rectilinear shape. The grooves are recesses in the stator core. Overall, the stator can have a plurality of grooves in the stator core.

The stator further comprises an electrical winding which comprises at least two dimensionally stable electrical conductors. The electrical conductors have an electrically conductive material. The fact that the conductors are dimensionally stable can mean that the conductors have a rigid shape. The conductors are, in particular, not flexible. The conductors can be inherently rigid. Furthermore, the conductors can be mechanically stable. For example, the conductors are in each case a rod. Therefore, the conductors each have a rod-shaped shape. For example, the cross-sectional profile of the conductors is trapezoidal. This means that the conductors are in each case trapezoidal in a cross section through the stator, wherein the cross section is given in a plane which runs perpendicularly to the longitudinal axis of the stator core. The dimensional stability of the conductors can be achieved by means of sufficient material thickness, the choice of material or by means of a strength-optimised shaping.

The stator further comprises at least one interconnecting element on at least one side of the stator core. The stator can have at least one interconnecting element on one side of the stator core. The interconnecting element can have an electrically conductive material. By way of example, the interconnecting element has copper and/or aluminum. The interconnecting element can be arranged on the base surface or the top surface of the stator core. The interconnecting element can have the shape of a ring segment. Furthermore, it is possible for the interconnecting element to have the shape of a ring. The interconnecting element can be arranged at a distance from the stator core. The electrical winding has at least two of the conductors and at least one interconnecting element. The stator can have multiple electrical windings.

At least one of the conductors is arranged in the grooves, respectively. This means that in each case at least one of the conductors is arranged in each groove. It is possible that exactly (e.g., only) one conductor is arranged in each groove, respectively. However, it is also possible that at least two conductors are arranged in each groove. By way of example, the conductors do not completely fill the grooves in each case. The conductors can have a greater extent along the longitudinal axis of the stator core than the grooves. The conductors can be electrically insulated from the stator core. To this end, in each case an insulation material can be arranged in the grooves. In this case, the insulation material is arranged between the conductors and the stator core.

The interconnecting element is electrically connected to at least one of the conductors. To this end, the interconnecting element can be in direct contact with at least one of the conductors. Furthermore, it is possible for the interconnecting element to be electrically connected to at least two of the conductors.

The interconnecting element is mechanically connected to the stator core via at least one of the conductors. This means that the interconnecting element is mechanically connected to at least one of the conductors. The conductors are each mechanically connected to the stator core. This enables the mechanical connection of the interconnecting element to the stator core via the conductor. The interconnecting element can be mechanically connected to the stator core via the at least one conductor to which it is electrically connected.

The conductors are each mechanically fixed in the grooves. This means that the conductors are each mechanically connected to the stator core. The fact that the conductors are mechanically fixed in the grooves can mean that the conductors are arranged immovably in the grooves. The conductors are therefore fixedly positioned in the grooves. As a result, the conductors are mechanically connected to the stator core. The fixing of the conductors in the grooves can be achieved, for example, by virtue of the fact that the conductors are pressed into the grooves. It is furthermore possible for the conductors to be fixed in the grooves with a fixing material. For this purpose, the fixing material is formed in the grooves in addition to the conductors. By way of example, the fixing material is a casting. The fixing material can be an insulation system or a part of an insulation system. The conductors are mechanically fixed in the grooves by the fixing material.

The mechanical connection between the interconnecting element and the stator core via at least one of the conductors is self-supporting. This means that there is a mechanical connection between the interconnecting element and the stator core via at least one of the conductors, and this mechanical connection is self-supporting. The fact that the mechanical connection is self-supporting can mean that no further mechanical connection is required for a stable connection of the interconnecting element to the stator core. The interconnecting element is therefore mechanically connected to the stator core mainly via at least one of the conductors. The mechanical connection between the interconnecting element and the stator core via at least one of the conductors is a supporting mechanical connection. The stator can therefore be free of further connecting elements between the interconnecting element and the stator core. The mechanical connection between the interconnecting element and the stator core via at least one of the conductors can be the only mechanical connection between the interconnecting element and the stator core. The interconnecting element can be mechanically connected to the stator core exclusively via at least one of the conductors.

The self-supporting mechanical connection between the interconnecting element and the stator core via at least one of the conductors enables a construction of the stator with a reduced complexity. The interconnecting element can be mechanically connected to the stator core mainly or exclusively via at least one of the electrical conductors. Therefore, no further carrier elements are required for fastening the interconnecting element to the stator core. Also, no assembly elements, no alignment elements for the assembly of the interconnecting element and no composite comprising multiple interconnecting elements insulated with respect to one another are required. Furthermore, no bending, or separate mechanical connection or assembly processes are required for fastening the interconnecting element to the stator core. This means that no additional processes are required for fastening the interconnecting element to the stator core after the electrical connection of the interconnecting element to the conductors. This reduces the complexity of the construction of the stator. The connection of the interconnecting element to the stator core via at least one of the conductors is sufficient for a stable fastening of the interconnecting element to the stator core.

A construction with a reduced complexity of the stator is advantageous during the production of the stator. Fewer connection processes and assembly steps are therefore required. The stator can therefore be produced efficiently. In addition, a construction with a reduced complexity of the stator during operation and during the maintenance of the electric machine is advantageous. Furthermore, the service life of the stator can be increased since fewer components are present overall which can fail.

According to at least one embodiment of the stator, the interconnecting element is mechanically connected in a form-fitting manner to at least one of the conductors. This can mean that the interconnecting element and the respective conductor each have a shape adapted to one another in places. In the region of the mechanical connection, the interconnecting element and the conductor can bear against one another in a form-fitting manner. By way of example, the interconnecting element and the at least one conductor can adjoin one another without gaps in the region of the mechanical connection. In the region of the form-fitting connection, the interconnecting element and the at least one conductor can be in direct contact. The form-fitting connection enables a mechanical connection with a high stability. This advantageously enables the interconnecting element to be mechanically self-supportingly connected to the stator core via the at least one conductor.

According to at least one embodiment of the stator, the interconnecting element has at least one recess. The recess can be open on at least one side. It is further possible for the interconnecting element to have at least two recesses. In a cross section through the stator, the recess can have a larger area than one of the conductors, wherein the cross section is given in a plane which runs perpendicularly to the longitudinal axis of the stator core. The recess can have a shape adapted to one of the conductors. The mechanical stability of the connection between the interconnecting element and the conductor can therefore be increased with the recess.

According to at least one embodiment of the stator, the interconnecting element is mechanically and electrically connected to one of the conductors in the region of the recess. For this purpose, the respective conductor can be arranged at least in places in the recess. In the recess, the interconnecting element and the respective conductor can be connected to one another in a form-fitting manner. In the region of the recess, the interconnecting element is electrically conductively connected to one of the conductors. Furthermore, the mechanical connection in the region of the recess between the interconnecting element and the conductor is self-supporting. This means that the interconnecting element is mechanically connected to the stator core via the mechanical connection in the region of the recess via the conductor. The mechanical connection between the interconnecting element and the conductor in the region of the recess can be produced by cold welding, laser welding, electron beam welding, metal inert gas welding, metal active gas welding, friction stir welding, soldering or via pressure or spring contacts. Since the interconnecting element is mechanically connected to the stator core via the conductor, the complexity of the construction of the stator is advantageously reduced.

According to at least one embodiment of the stator, one of the conductors extends through the recess. The conductor can extend completely through the recess. The recess can extend completely through the interconnecting element. Due to the fact that the conductor extends through the recess, the interconnecting element can be connected to the conductor in a mechanically stable manner.

According to at least one embodiment of the stator, the recess has a shape for positioning a conductor in the recess. This means that the recess has a shape which simplifies the positioning of a conductor in the recess. By way of example, the recess has bevelled side faces. These can serve for positioning a conductor in the recess. The recess can have a shape adapted to the conductor. By way of example, the recess has a shape for guiding or for inserting a conductor into the recess. In this manner, the positioning of a conductor in the recess is simplified.

According to at least one embodiment of the stator, the stator has an insulation system which is arranged at least in intermediate spaces between the stator core and the conductors and/or between the stator core and the interconnecting element. The insulation system has an electrically insulating material. The insulation system can electrically insulate the conductors from the stator core. Therefore, the insulation system can be arranged at least in places in the grooves. Furthermore, the insulation system can electrically insulate the interconnecting element from the stator core. The insulation system can have a casting. The insulation system can be cast or injection-molded. The insulation system can be integral. This means that the insulation system does not consist of multiple parts but only of one part. Furthermore, the insulation system can be in mechanical contact with the stator core and the interconnecting element. The insulation system can therefore also contribute to a mechanical connection between the interconnecting element and the stator core. However, the mechanical connection between the interconnecting element and the stator core via at least one of the conductors is already self-supporting. Therefore, the insulation system is not required for a mechanical fastening of the interconnecting element to the stator core. However, since the insulation system can contribute to the mechanical connection, it is possible for the interconnecting element to be mechanically connected to the stator core exclusively via at least one of the conductors and the insulation system. The insulation system enables an efficient electrical insulation both of the stator core from the conductors and of the stator core from the interconnecting element. Moreover, the insulation system can be in contact with a cooling system. Therefore, other constituent parts of the stator can also be cooled via the insulation system. In order to cool the interconnecting element, it is moreover possible for the latter to be connected to a cooling system via a thermally conductive material.

According to at least one embodiment of the stator, the stator has at least one further interconnecting element. The further interconnecting element can have the same construction as the interconnecting element. Moreover, the further interconnecting element can have the same features as the interconnecting element. The interconnecting element and the further interconnecting element can be arranged on the same side of the stator core. In this case, the interconnecting element and the further interconnecting element can be arranged one above the other along the longitudinal axis of the stator core. Furthermore, it is possible for the interconnecting element and the further interconnecting element to be arranged next to one another in a cross section through the stator. The interconnecting element and the further interconnecting element can be connected to one another via an insulation resin, a composite material, adhesively bonded insulations, a casting compound or a plastic injection molding. Overall, the stator can have a multiplicity of interconnecting elements and/or a multiplicity of further interconnecting elements. A multiplicity of interconnecting elements and/or of further interconnecting elements enables a separate electrical control of the conductors.

According to at least one embodiment of the stator, the interconnecting element and the further interconnecting element are electrically insulated from one another. For this purpose, at least one of the following materials can be arranged between the interconnecting element and the further interconnecting element: an insulation resin, a composite material, an adhesively bonded insulation, a casting compound, a plastic injection molding, an insulating material, an insulation paper, a coating. Furthermore, it is possible for the interconnecting element and/or the further interconnecting element to have a surface treatment. In the region of the surface treatment, the interconnecting element and/or the further interconnecting element can be electrically insulating. The surface treatment can be a surface modification such as oxidation, for example. It is furthermore possible for the interconnecting element and the further interconnecting element to be connected to one another by an insulator wound around them. It is also possible for the interconnecting element and the further interconnecting element to be connected to one another via a matrix composed of an insulating material or plastic. It is necessary to electrically insulate the interconnecting element and the further interconnecting element from one another in order to enable a separate control of the conductors.

According to at least one embodiment of the stator, the interconnecting element and the further interconnecting element have an intermeshing shape in places. This can mean that the interconnecting element and the further interconnecting element enter into a form fit with one another in places. The intermeshing shape increases the stability of the connection of the interconnecting element to the further interconnecting element or of the fastening of the interconnecting element and of the further interconnecting element to the stator core.

Furthermore, an electric machine is specified. According to at least one embodiment of the electric machine, the electric machine has a stator described here. Therefore, all features of the described stator are also disclosed for the stator of the electric machine, and vice versa. The electric machine furthermore has a rotor which is movable relative to the stator. The rotor can be an internal rotor or an external rotor. An air gap can be arranged between the stator and the rotor. Since the mechanical connection between the interconnecting element and the stator core via at least one of the conductors is self-supporting, the complexity of the construction of the electric machine is also reduced. This makes it possible that the electric machine can be produced efficiently.

Furthermore, a method for producing a stator for an electric machine is specified. The stator can preferably be produced using a method described here. In other words, all features disclosed for the stator are also disclosed for the method for producing a stator for an electric machine, and vice versa.

According to at least one embodiment of the method for producing a stator for an electric machine, the method comprises a method step in which a stator core of the stator having at least two grooves is provided. The grooves are formed in the stator core. Subsequently, the grooves can be electrically insulated. This can mean that the grooves are lined with an electrically insulating material.

Furthermore, at least two dimensionally stable electrical conductors are made in the grooves, wherein at least one of the conductors is arranged in each case in the grooves. The conductors are mechanically fixed in the respective grooves. The fixing of the conductors in the grooves can be achieved, for example, by virtue of the fact that the conductors are pressed into the grooves. It is furthermore possible for the conductors to be fixed in the grooves with a fixing material, for example a casting. For this purpose, firstly the conductors are formed in the grooves. Subsequently, remaining cavities in the grooves are filled with the casting. By curing the casting, the conductors are mechanically fixed in the grooves. The introduction and fixing of the conductors in the grooves can be carried out in one step or in separate steps.

Furthermore, at least one interconnecting element is attached to at least one side of the stator core. This means that the interconnecting element is mechanically connected to the stator core.

The steps of the method can be carried out in any order which can deviate from the order mentioned here.

An electrical winding of the stator comprises the conductors and the interconnecting element. This can mean that an electrical winding of the stator has at least two of the conductors and at least one interconnecting element. The stator can have multiple electrical windings. The interconnecting element is electrically connected to at least one of the conductors. The interconnecting element is mechanically connected to the stator core via at least one of the conductors. The conductors are each mechanically fixed in the grooves. The mechanical connection between the interconnecting element and the stator core via at least one of the conductors is self-supporting.

The self-supporting mechanical connection between the interconnecting element and the stator core via at least one of the conductors enables an efficient production of the stator. Since no bending, connection or assembly processes are required for fastening the interconnecting element to the stator core, the production method is less complex. Also, no further carrier elements, assembly elements or alignment elements are required. Because of this simplification of the production method, the stator can be produced efficiently.

According to at least one embodiment of the method, the stator has at least one further interconnecting element, and the interconnecting element and the further interconnecting element are mechanically connected to one another and electrically insulated from one another before being attached to the stator core. Also for the case where the stator has more than one interconnecting element and more than one further interconnecting element, the interconnecting elements and the further interconnecting elements are mechanically connected to one another and electrically insulated from one another before being attached to the stator core. This facilitates the attachment to the stator core since, instead of a plurality of elements, only one composite of the interconnecting elements and further interconnecting elements has to be attached. It is furthermore possible for the interconnecting elements and the further interconnecting elements to be connected to one another to form multiple partial composites before being attached to the stator core. The interconnecting element and the further interconnecting element can be connected to one another by plastic hot-caulking or plastic riveting. An electrically insulating material can be arranged between the interconnecting element and the further interconnecting element.

According to at least one embodiment of the method, the interconnecting element is electrically connected to at least one of the conductors by cold welding, laser welding, electron beam welding, metal inert gas welding, metal active gas welding, friction stir welding, soldering or via pressure or spring contacts. It is furthermore possible for the interconnecting element to be connected to at least one of the conductors by pressing or pressing-on (press fit). These methods enable a stable mechanical connection as well as a good electrical connection between the interconnecting element and the conductor.

The stator described here, the electric machine and the method for producing a stator for an electric machine are explained in more detail below in conjunction with exemplary embodiments and the associated figures.

Figure 5:
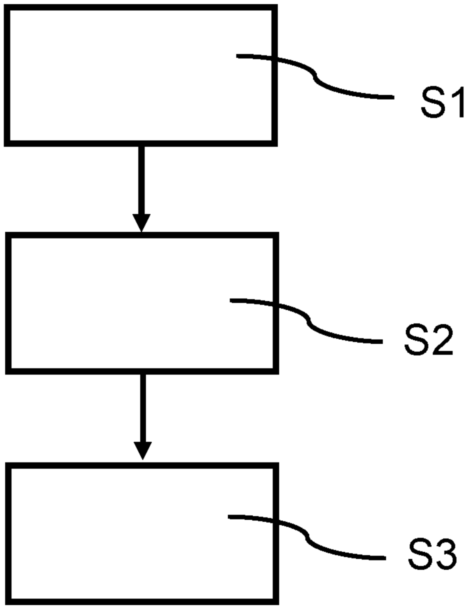

An exemplary embodiment of the method for producing a stator for an electric machine is described with FIG. 5.

Figure 6:
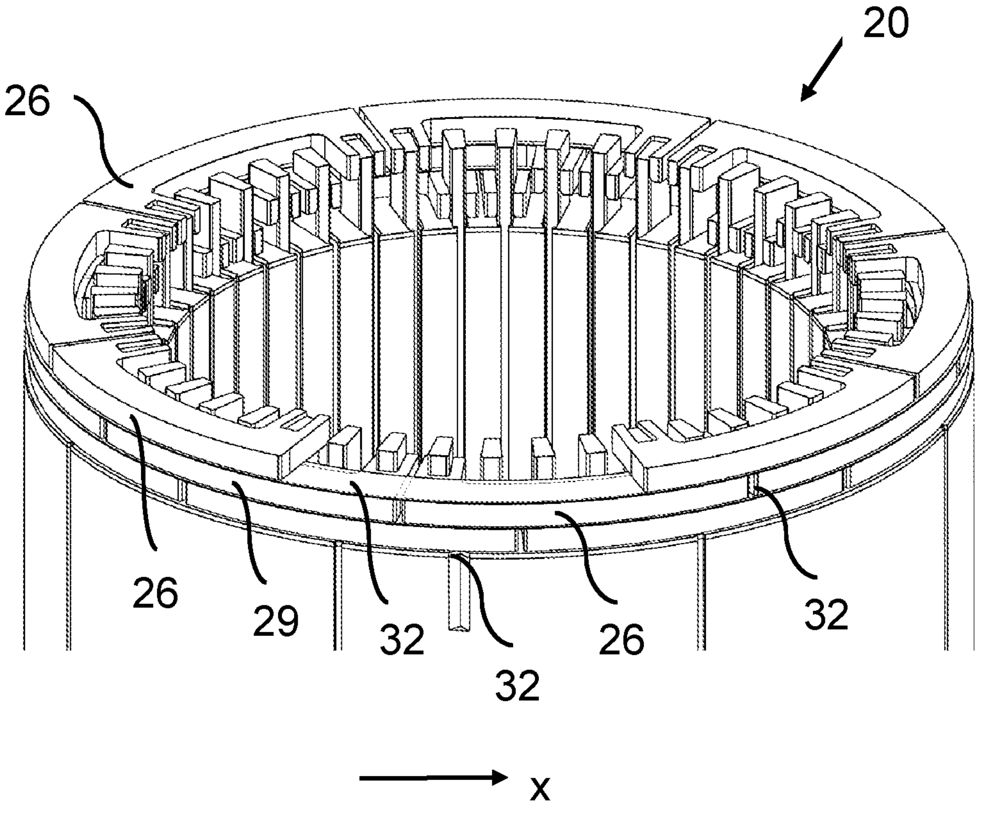
Figure 7:
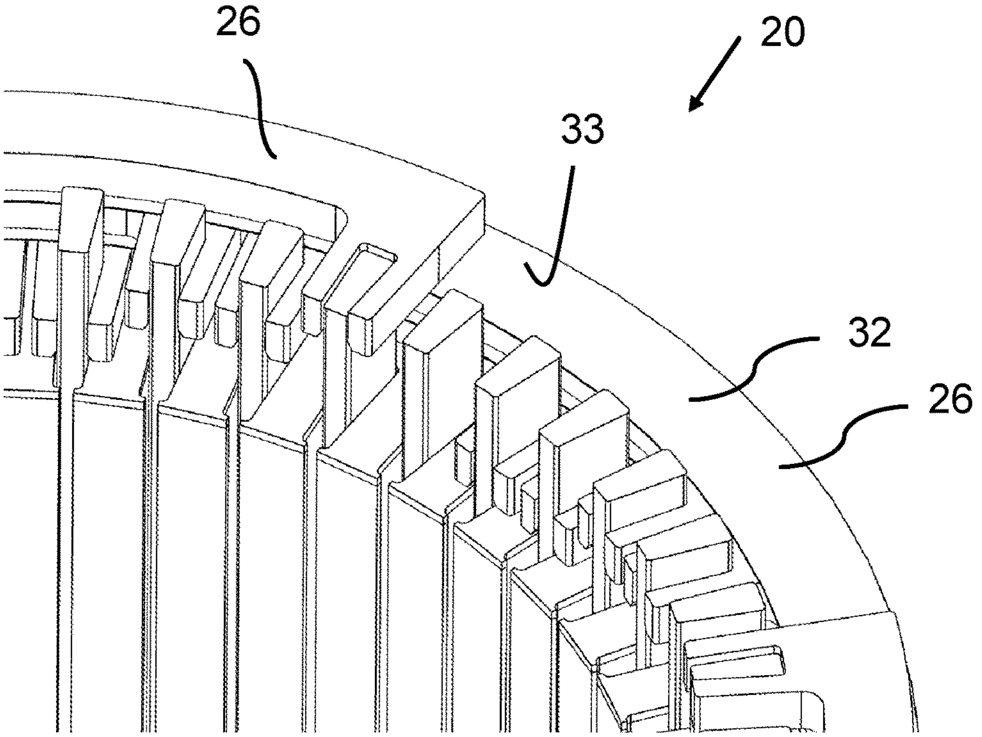

A further exemplary embodiment of the stator is described with FIGS. 6 and 7.

Figure 8:
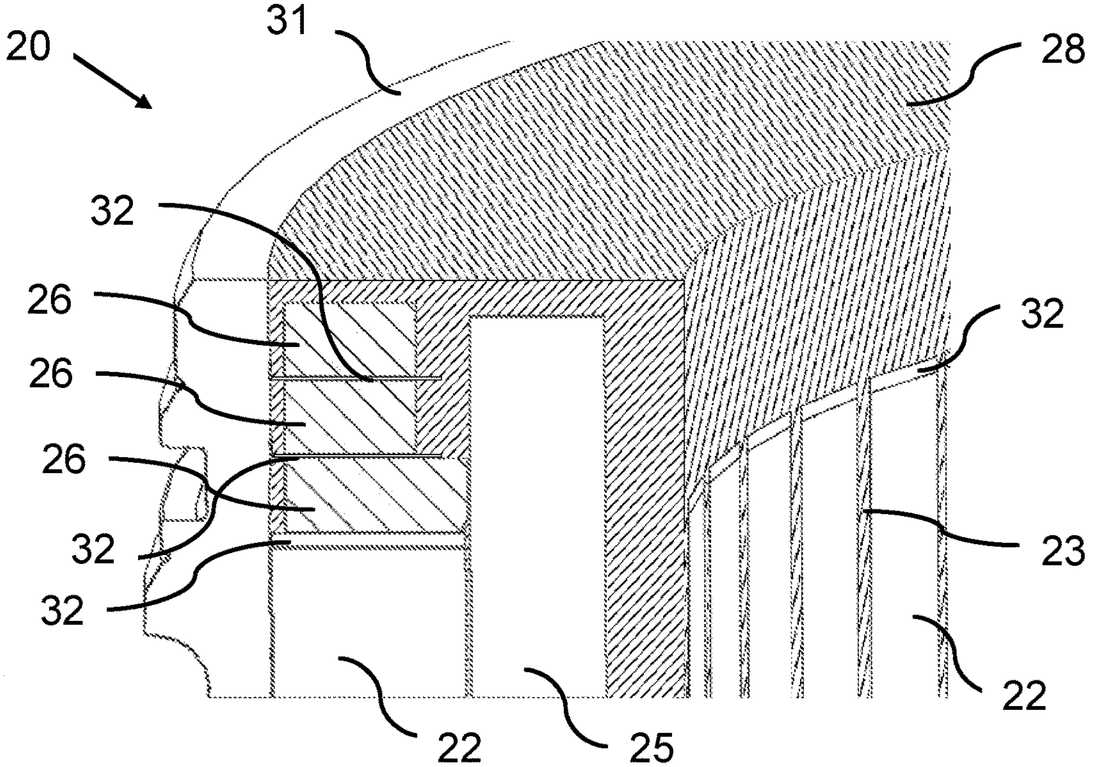
Figure 9:
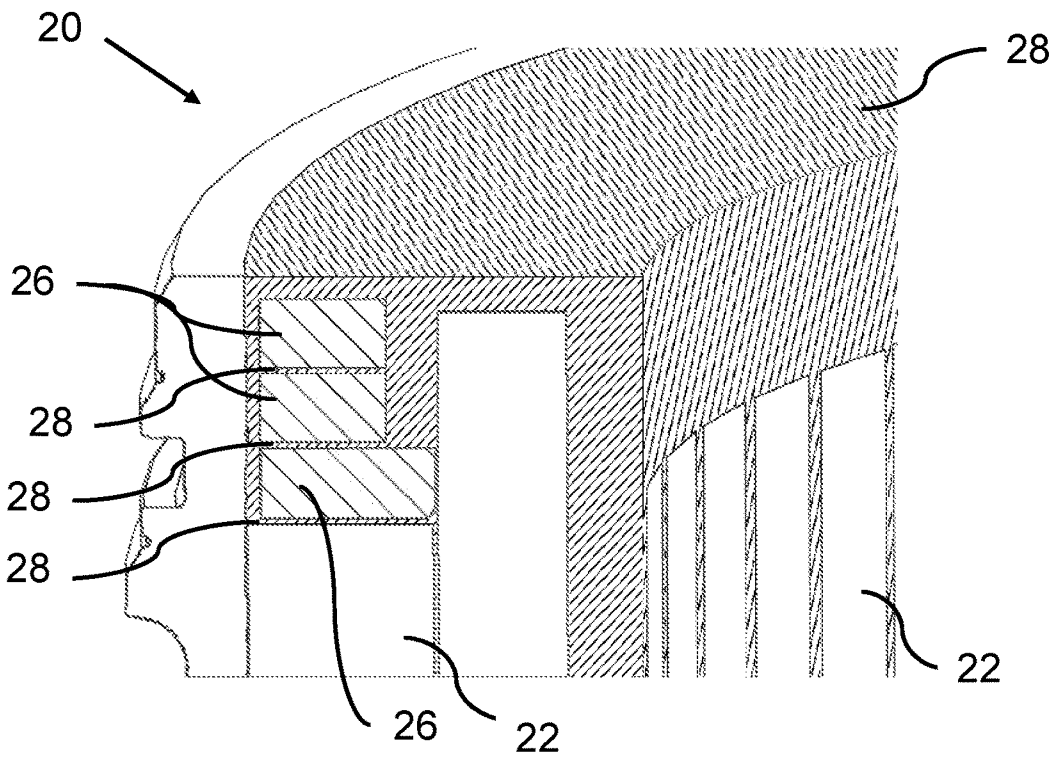

Sectional illustrations through further exemplary embodiments of the stator are shown in FIGS. 8 and 9.

Figure 10:
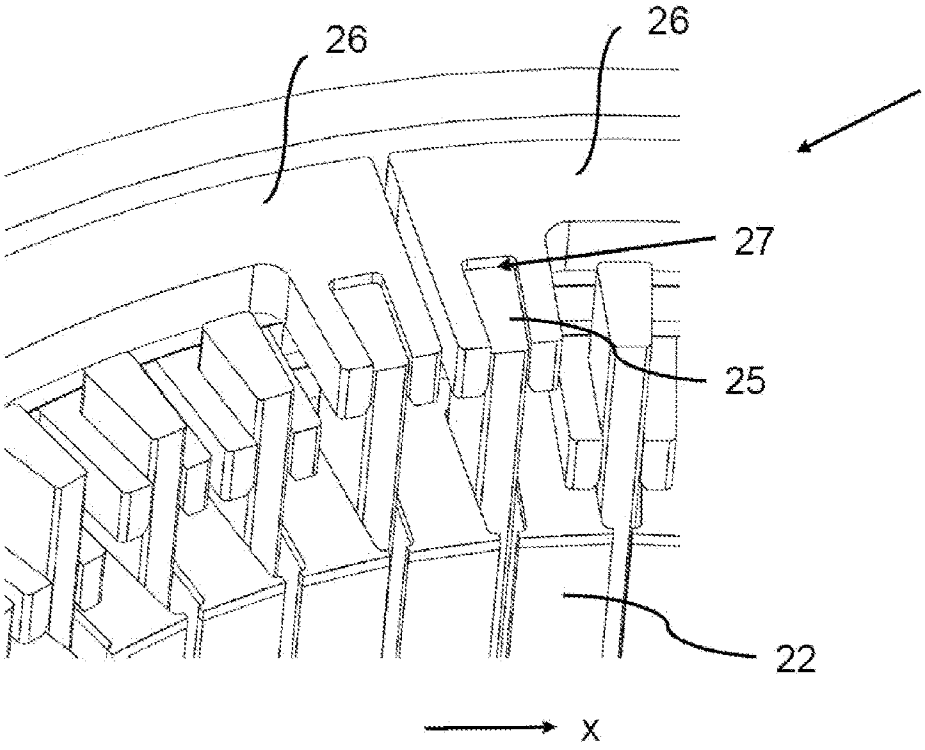
Figure 11:
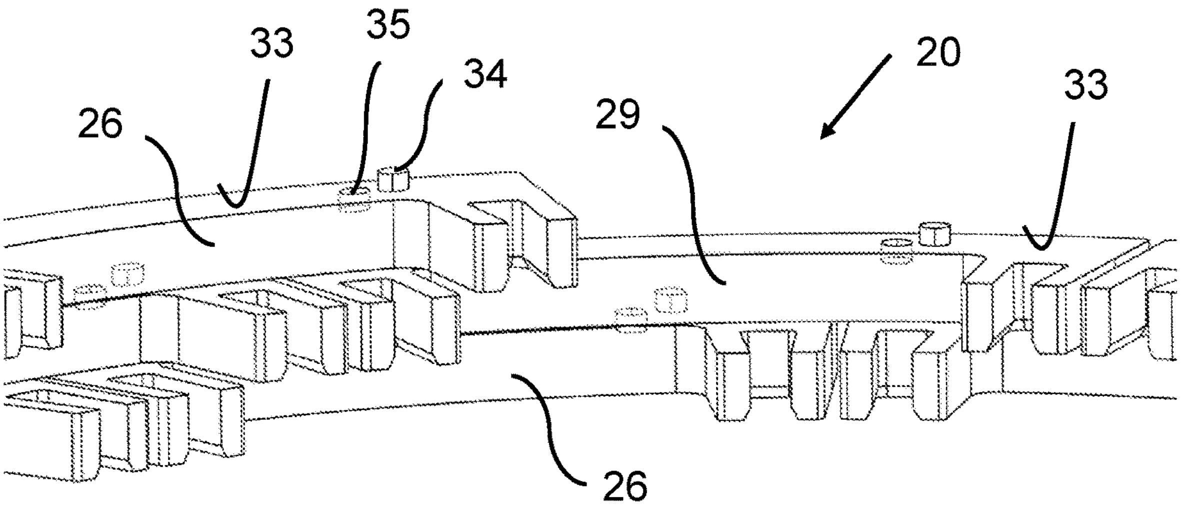

FIGS. 10 and 11 show excerpts from further exemplary embodiments of the stator.

DETAILED DESCRIPTION

Figure 1:
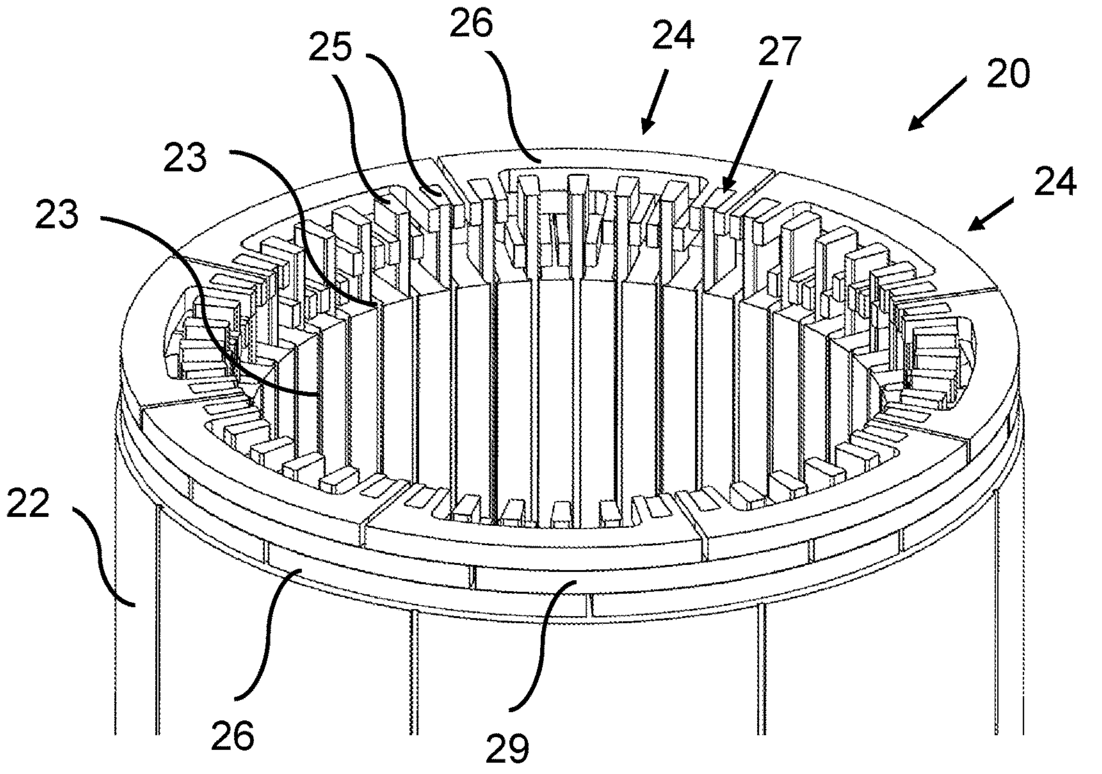
FIGS. 1, 2 and 3 show exemplary embodiments of the stator.

An exemplary embodiment of a stator 20 for an electric machine 21 is shown in FIG. 1. The view in FIG. 1 is an oblique side view, in which not the entire stator 20 is illustrated. The stator 20 comprises a stator core 22, which has the shape of a cylinder. A plurality of grooves 23 is arranged in the stator core 22. The grooves 23 extend completely through the stator core 22. Moreover, the grooves 23 are arranged next to one another along a circumference of the stator core 22. The grooves 23 each have identical spacings with respect to one another. Therefore, the grooves 23 are distributed uniformly along the circumference of the stator core 22.

One dimensionally stable electrical conductor 25 is arranged in the grooves 23, respectively. The grooves 23 are open toward the center of the stator core 22. The conductors 25 do not completely fill the grooves 23 in each case. Adjoining the openings, the grooves 23 each have a region which is free of the conductors 25. The conductors 25 are a rod, respectively. Along a longitudinal axis of the stator core 22, the conductors 25 extend out of the stator core 22. Therefore, the conductors 25 project out of the stator core 22 on one side. The conductors 25 all project out of the stator core 22 by the same length.

The stator 20 further has a plurality of interconnecting elements 26. The stator 20 can have a plurality of interconnecting elements 26 and at least one further interconnecting element 29. The interconnecting elements 26 and the further interconnecting element 29 can have the same construction and the same features. The interconnecting elements 26 are arranged on at least one side of the stator core 22. In addition, the stator 20 has a plurality of electrical windings 24. Each electrical winding 24 of the stator 20 has at least two of the conductors 25 and at least one interconnecting element 26 or at least one further interconnecting element 29.

The interconnecting elements 26 each have the shape of a ring segment. The interconnecting elements 26 are arranged distributed along the circumference of the stator core 22. In addition, some of the interconnecting elements 26 are arranged one above the other along the longitudinal axis of the stator core 22. The interconnecting elements 26 have an electrically conductive material.

Each of the interconnecting elements 26 is electrically connected to at least one of the conductors 25. In this case, each of the interconnecting elements 26 is electrically connected to two conductors 25. This means that two of the conductors 25 are electrically connected to one another, respectively, via one interconnecting element 26, respectively. For this purpose, each interconnecting element 26 has two recesses 27. In the region of the recesses 27, each of the interconnecting elements 26 is mechanically and electrically connected to one of the conductors 25, respectively. For this purpose, one of the conductors 25 extends through each of the recesses 27. This means that one of the conductors 25 is arranged in each of the recesses 27. In the region of the recesses 27, the interconnecting elements 26 are mechanically connected in a form-fitting manner to one of the conductors 25, respectively. The interconnecting elements 26 and the conductors 25 can be electrically and mechanically connected to one another via different processes in the region of the recesses 27, respectively. For example, the connection between an interconnecting element 26 and a conductor 25 is achieved by cold welding, laser welding, electron beam welding, metal inert gas welding, metal active gas welding, friction stir welding, soldering or via pressure or spring contacts.

Each of the interconnecting elements 26 is mechanically connected to the stator core 22 via at least one of the conductors 25, respectively. In addition, the conductors 25 are mechanically fixed in the grooves 23, respectively. This makes it possible that the mechanical connection between the respective interconnecting element 26 and the stator core 22 is self-supporting via at least one of the conductors 25. This mechanical connection is therefore so stable that no further mechanical connection is required.

Furthermore, the interconnecting elements 26 are electrically insulated from one another. This means that each of the interconnecting elements 26 is electrically insulated from the other interconnecting elements 26. In addition, the interconnecting elements 26 are electrically insulated from the further interconnecting element 29. For this purpose, an electrically insulating material can be arranged between the interconnecting elements 26 and the further interconnecting element 29. The insulating material is not shown in FIG. 1. Furthermore, it is possible for the interconnecting elements 26 and/or the further interconnecting element 29 to be electrically insulating in places by a surface treatment.

Figure 2:
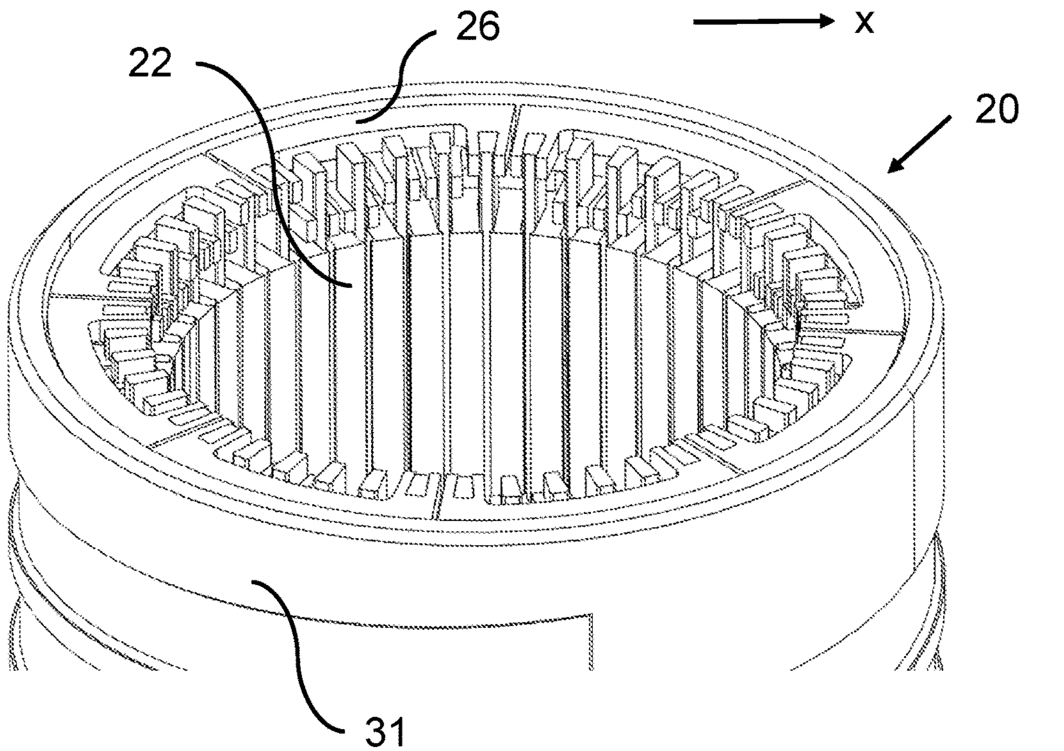

A further exemplary embodiment of the stator 20 is shown in FIG. 2. The only difference from the construction shown in FIG. 1 is that the stator 20 additionally has a casing 31. The casing 31 surrounds the stator core 22 in lateral directions x, wherein the lateral directions x run perpendicularly to the longitudinal axis of the stator core 22. Moreover, the casing 31 surrounds the interconnecting elements 26 in lateral directions x. The casing 31 may have aluminum.

Figure 3:
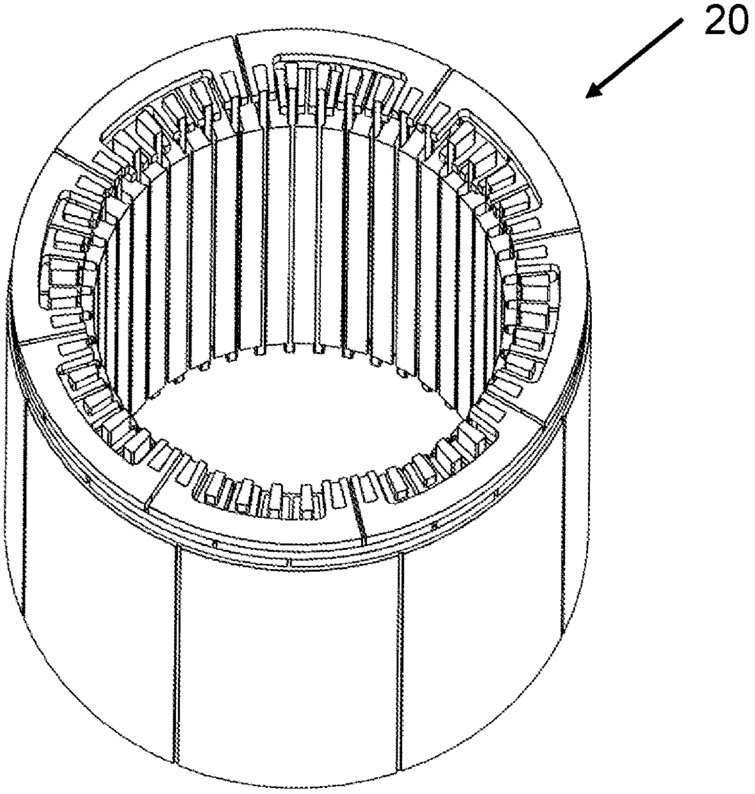

In FIG. 3, the exemplary embodiment of the stator 20 from FIG. 1 is shown in a tilted plan view.

Figure 4:
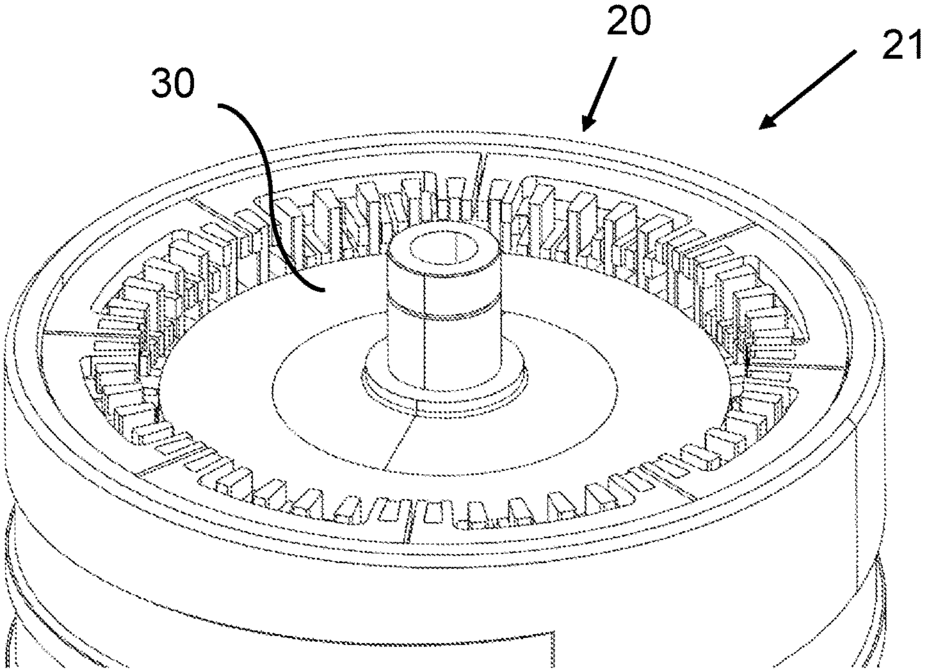
FIG. 4 shows an exemplary embodiment of the electric machine.

An exemplary embodiment of the electric machine 21 is shown in FIG. 4. The electric machine 21 has a stator 20 as shown in FIG. 2. Moreover, the electric machine 21 has a rotor 30 which is movable relative to the stator 20. The rotor 30 is an internal rotor and is arranged in the stator 20.

An exemplary embodiment of the method for producing a stator 20 for an electric machine 21 is described with FIG. 5. In a first step S1, the stator core 22 of the stator 20 is provided. The stator core 22 has at least two grooves 23. In a second step S2, at least two dimensionally stable electrical conductors 25 are formed in the grooves 23, wherein at least one of the conductors 25 is arranged in the grooves 23, respectively. In addition, the conductors 25 are mechanically fixed in the grooves 23. In a third step S3, at least one interconnecting element 26 is attached to at least one side of the stator core 22. For this purpose, the interconnecting element 26 is electrically and mechanically connected to at least one of the conductors 25. This can be achieved by cold welding, laser welding, electron beam welding, metal inert gas welding, metal active gas welding, friction stir welding, soldering or via pressure or spring contacts.

In an optional step before the third step S3, at least one interconnecting element 26 and at least one further interconnecting element 29 are mechanically connected to one another and electrically insulated from one another before being attached to the stator core 22. The interconnecting element 26 and the further interconnecting element 29 can be mechanically connected to one another via an insulation resin, a composite material, adhesively bonded insulations, a casting compound or a plastic injection molding. The electrical insulation of the interconnecting elements 26 from one another can be achieved by virtue of the fact that an electrically insulating material is arranged between the interconnecting elements 26. Furthermore, it is possible for the interconnecting element 26 and/or the further interconnecting element 29 to have a surface treatment. In the region of the surface treatment, the interconnecting element 26 and/or the further interconnecting element 29 can be electrically insulating.

A further exemplary embodiment of the stator 20 is shown in FIG. 6. In comparison with the exemplary embodiment shown in FIG. 1, one of the interconnecting elements 26 is not illustrated in FIG. 6 for illustration. Moreover, the interconnecting elements 26 and the further interconnecting element 29 are electrically insulated from one another. For this purpose, an electrically insulating material 32 is arranged between the interconnecting elements 26 and the further interconnecting element 29. Furthermore, it is possible for the interconnecting elements 26 and/or the further interconnecting element 29 to have a surface treatment. In the region of the surface treatment, the interconnecting elements 26 and/or the further interconnecting element 29 are electrically insulating. In FIG. 6, it is shown that the electrically insulating material 32 is arranged on the interconnecting elements 26 which are exposed since one of the interconnecting elements 26 is not illustrated. Also in lateral directions x between the interconnecting elements 26, the electrically insulating material 32 is arranged. Below the location at which one of the interconnecting elements 26 is not illustrated, a section in the stator core 22 is illustrated. In this section, it can be seen that the electrically conductive material 32 is also situated between the interconnecting elements 26 and the stator core 22.

In FIG. 7, an excerpt from the exemplary embodiment of the stator 20 shown in FIG. 6 is illustrated. Also in FIG. 7, one of the interconnecting elements 26 is not illustrated for illustration. The electrically insulating material 32 is arranged on the upper side 33 of the interconnecting element 26 situated therebelow. The upper side 33 of the interconnecting elements 26 and of the further interconnecting elements 29 faces away from the stator core 22.

FIG. 8 shows a sectional illustration through part of a further exemplary embodiment of the stator 20. The stator 20 additionally has an insulation system 28. The insulation system 28 is arranged in intermediate spaces between the stator core 22 and the conductors 25. Furthermore, the insulation system 28 is arranged between the stator core 22 and the interconnecting elements 26. The insulation system 28 is a casting. The latter fills the intermediate spaces in the region of the conductors 25 and of the interconnecting elements 26.

In the cross section in FIG. 8, it is shown that one of the conductors 25 extends beyond the extent of the stator core 22. An electrically insulating material 32 is arranged between the stator core 22 and one of the interconnecting elements 26. The electrically insulating material 32 is arranged on the stator core 22 at the side at which the interconnecting elements 26 are arranged. The insulation system 28 is arranged in the regions of the grooves 23 which are free of the conductors 25. The regions of the grooves 23 in which the insulation system 28 is arranged are visible at the inner side of the stator core 22. The casing 31 is arranged around the stator core 22 and the interconnecting elements 26.

The conductor 25 shown in a cross-sectional view is connected to the lowermost of the three interconnecting elements 26 shown in cross section. In each case one electrically insulating material 32 is arranged between the interconnecting elements 26. The two interconnecting elements 26 arranged above the lowermost interconnecting element 26 do not extend as far as the conductor 25, and therefore these are not connected to the conductor 25. The intermediate spaces between the stator core 22, the conductors 25 and the interconnecting elements 26 are filled by the insulation system 28.

A sectional illustration through part of a further exemplary embodiment of the stator 20 is shown in FIG. 9. The only difference from the exemplary embodiment shown in FIG. 8 consists in that the insulation system 28 is used instead of the electrically insulating material 32. This means that the insulation system 28 is arranged between the interconnecting elements 26. Moreover, the insulation system 28 is arranged on the stator core 22 at the side at which the interconnecting elements 26 are arranged. The insulation system therefore electrically insulates the stator core 22 from the interconnecting elements 26. Furthermore, the insulation system 28 electrically insulates the interconnecting elements 26 from one another.

In FIG. 10, an excerpt from a further exemplary embodiment of the stator 20 is shown. The recesses 27 of the interconnecting elements 26 have a shape for positioning a conductor 25 in the recess 27, respectively. For this purpose, the recesses 27 have the shape of a trapezoid in a cross section through the stator 20, respectively, wherein the cross section is given in a plane which runs perpendicularly to the longitudinal axis of the stator core 22. The conductors 25 also have the shape of a trapezoid in this cross section. Therefore, the conductors 25 can be positioned in a precisely fitting manner in the recesses 27. Moreover, slipping of the conductors 25 in lateral directions x is prevented by the trapezoid-like shape.

In FIG. 11, an excerpt from a further exemplary embodiment of the stator 20 is shown. In this case, one interconnecting element 26 and a further interconnecting element 29 have an intermeshing shape in places, respectively. At their upper side 33, the interconnecting elements 26 and the further interconnecting elements 29 each have a protrusion 34. At their lower side facing away from the upper side 33, the interconnecting elements 26 and the further interconnecting elements 29 each have a notch 35 which has the shape of the protrusion 34. The interconnecting elements 26 and the further interconnecting elements 29 can be attached to the stator core 22 in such a way that one protrusion 34 is arranged in a notch 35, respectively. Therefore, in each case one interconnecting element 26 and a further interconnecting element 29 engage with one another in places, which increases the stability of the connection of the interconnecting elements 26 and of the further interconnecting elements 29 to one another.

LIST OF REFERENCE SIGNS

20: stator
21: electric machine
22: stator core
23: groove
24: electrical winding
25: conductor
26: interconnecting element
27: recess
28: insulation system
29: further interconnecting element
30: rotor
31: casing
32: electrically insulating material
33: upper side
34: protrusion
35: notch
S1, S2, S3: steps
x: lateral direction

The invention claimed is:

1. A stator for an electric machine, the stator comprising:
a stator core,
at least two grooves which are arranged in the stator core,
an electrical winding which comprises at least two dimensionally stable electrical conductors, and
at least one interconnecting element on at least one side of the stator core, wherein
in each case only one of the conductors is arranged in each groove,
the interconnecting element is electrically connected to at least one of the conductors,
the interconnecting element is mechanically connected to the stator core by at least one of the conductors, the at least one conductor being connected to the interconnecting element with the cross-sectional profile of the conductor being the same at the connection to the inter-connecting element as in the respective groove,
the conductors are each mechanically fixed in the grooves, and
the mechanical connection between the interconnecting element and the stator core is self-supporting via at least one of the conductors such that the connection between the interconnecting element and the stator core is a stable mechanical connection free of further mechanical connections.

2. The stator according to claim 1, wherein the interconnecting element is mechanically connected in a form-fitting manner to at least one of the conductors.

3. The stator according to claim 1, wherein the interconnecting element has at least one recess.

4. The stator according to claim 3, wherein the interconnecting element is mechanically and electrically connected to one of the conductors in the region of the recess.

5. The stator according to claim 3, wherein one of the conductors extends through the recess.

6. The stator according to claim 3, wherein the recess has a shape for positioning a conductor in the recess.

7. The stator according to claim 1, which has an insulation system which is arranged at least in intermediate spaces between the stator core and the conductors and/or between the stator core and the interconnecting element.

8. The stator according to claim 1, which has at least one further interconnecting element.

9. The stator according to claim 8, wherein the interconnecting element and the further interconnecting element are electrically insulated from one another.

10. The stator according to claim 8, wherein the interconnecting element and the further interconnecting element have an intermeshing shape in places.

11. An electric machine having a stator according to claim 1 and a rotor which is movable relative to the stator.

12. A method for producing a stator for an electric machine comprising the following steps:

providing a stator core of the stator with at least two grooves, introducing at least two dimensionally stable electrical conductors into the grooves, wherein only one of the conductors is arranged in each groove, respectively, mechanically fixing the conductors in the respective grooves, and attaching at least one interconnecting element to at least one side of the stator core, wherein an electrical winding of the stator comprises the conductors and the interconnecting element, the interconnecting element is electrically connected to at least one of the conductors, the interconnecting element is mechanically connected to the stator core by at least one of the conductors, the at least one conductor being connected to the interconnecting element with the cross-sectional profile of the conductor being the same at the connection to the inter-connecting element as in the respective groove, the conductors are each mechanically fixed in the grooves, and the mechanical connection between the interconnecting element and the stator core is self-supporting via at least one of the conductors such that the connection between the interconnecting element and the stator core is a stable mechanical connection free of further mechanical connections.

13. The method according to claim 12, wherein the stator has at least one further interconnecting element, and the interconnecting element and the further interconnecting element are electrically insulated from one another before being attached to the stator core.

14. The method according to claim 12, wherein the interconnecting element is electrically connected to at least one of the conductors by cold welding, laser welding, electron beam welding, metal inert gas welding, metal active gas welding, friction stir welding, soldering or via pressure or spring contacts.

* * * * *